US011439150B2

(12) United States Patent
John et al.

(10) Patent No.: US 11,439,150 B2
(45) Date of Patent: Sep. 13, 2022

(54) METHODS AND COMPOSITIONS FOR TREATING ALGAE USING METAL PHENOLIC NETWORKS

(71) Applicant: The Administrators of the Tulane Educational Fund, New Orleans, LA (US)

(72) Inventors: Vijay T. John, Destrehan, LA (US); Igor K. M. Tsengam, New Orleans, LA (US)

(73) Assignee: The Administrators of the Tulane Educational Fund, New Orleans, LA (US)

( * ) Notice: Subject to any disclaimer, the term of this patent is extended or adjusted under 35 U.S.C. 154(b) by 0 days.

(21) Appl. No.: 17/087,004

(22) Filed: Nov. 2, 2020

(65) Prior Publication Data

US 2022/0132858 A1 May 5, 2022

(51) Int. Cl.
*A01N 59/16* (2006.01)
*A01N 31/08* (2006.01)

(52) U.S. Cl.
CPC ............ *A01N 59/16* (2013.01); *A01N 31/08* (2013.01)

(58) Field of Classification Search
CPC ................................ A01N 59/16; A01N 31/08
See application file for complete search history.

(56) References Cited

U.S. PATENT DOCUMENTS

2013/0295362 A1 11/2013 Kanatzidis et al.

FOREIGN PATENT DOCUMENTS

WO WO-2014197940 A1 12/2014

OTHER PUBLICATIONS

Ojo et al., ACS Appl Nano Mater., 2019, 2, 3490-3500.*
Tsengam et al., ACS Appl Nano Mater, 2019, 2, 7134-7143.*
Biswas et al., "Biocompatible functionalisation of nanoclays for improved environmental remediation," *Chem. Soc. Rev.*, 2019, vol. 48, pp. 3740-3770 (abstract only).
Ejima at al., "Metal-phenolic networks as a versatile platform to engineer nanomaterials and biointerfaces," *Nano Today*, vol. 12 (2017) pp. 136-148.
Fan et al., "Growth inhibition of Microcystic aeruginosa by metal-organic frameworks: effect of variety, metal ion and organic ligand," *RSC Adv*., 2018, vol. 8, pp. 35314-35326.
Guo et al., "Engineering Multifunctional Capsules through the Assembly of Metal-Phenolic Networks," *Angew. Chem. Int. Ed*., 2014, vol. 53, pp. 5546-5551.
Jeong et al., "Physiological and Molecular Response of Prorocentrum minimum to Tannic Acid: An Experimental Study to Evaluate the Feasibility of Using Tannic Acid in Controling the Red Tide in a Eutrophic Coastal Water," *Int. J. Environ. Res. Public Health* 2016, vol. 13(5), p. 503.
John et al., "A Thin Shroud with Integrated Algaecide to Flocculate and Sink Karenia brevis," presented at MOTE Marine Laboratory and Aquarium Technology Advisory Council Public Meeting on Apr. 2, 2020.
John et al., "A Shroud with integrated Algaecide to Entrap and Sink Karenia brevis," presented at MOTE Marine Laboratory and Aquarium Technology Advisory Council Public Meeting on Oct. 2, 2020.
Long et al., "Efficient incorporation of diverse components into metal organic frameworks via metal phenolic networks," *Chem. Commun*., 2017, vol. 53, pp. 10831-10834 (abstract only).
Luo et al., "Engineering robust metal-phenolic network membranes for uranium extraction from seawater," *Energy Environ. Sci*., 2019, vol. 12, pp. 607-614 (abstract only).
New England Interstate Water Pollution Control Commission (NEIWPCC) "Harmful Algal Bloom Control Methods Synopses," Jun. 2015.
Orlowska at al., "β-O-4 type dilignol compounds and their iron complexes for modeling of iron binding to humic acids: synthesis, characterization, electrochemical studies and algal growth experiments," *New J. Chem*., 2017, vol. 41, pp. 11546-11555.
Tsengam et al., "A Two Dimensional Molecularly Thin Skin to Flocculate and Sink Harmful Algae," presented at 10th U.S. Symposium on Harmful Algae, Orange Beach, Alabama, Nov. 3-7, 2019.

* cited by examiner

*Primary Examiner* — Kyle A Purdy
(74) *Attorney, Agent, or Firm* — Marshall, Gerstein & Borun LLP

(57) ABSTRACT

The disclosure relates to a metal phenolic network (MPN) composition for treating algae in an aqueous environment, in particular to entrap/capture, flocculate, and settle or otherwise remove the algae from a location where it damages the aqueous environment and/or harms organisms in the aqueous environment. The MPN composition includes a metal phenolic network (MPN) film and a secondary flocculant such as a clay material or ionic flocculant. Application of the MPN composition to an aqueous environment, for example a marine environment containing a harmful algal bloom (HAB) induces flocculation of the algae with the MPN composition and sedimentation of the resulting floc. Algae removed from a surface region of the aqueous environment in this way eventually kills the algae at least due to a lack of sunlight, and reduces or eliminates the ability of the algae to further damage the aqueous environment until its eventual death.

25 Claims, 10 Drawing Sheets

METHODS AND COMPOSITIONS FOR TREATING ALGAE USING METAL PHENOLIC NETWORKS

CROSS REFERENCE TO RELATED APPLICATION

None.

STATEMENT OF GOVERNMENT INTEREST

None.

BACKGROUND OF THE DISCLOSURE

Field of the Disclosure

The disclosure relates to a metal phenolic network (MPN) composition for treating algae in an aqueous environment, in particular to entrap/capture, flocculate, and settle algae therein. The MPN composition includes a metal phenolic network (MPN) film and a secondary flocculant such as a clay material or ionic flocculant. Application of the MPN composition to an aqueous environment, for example a marine environment containing a harmful algal bloom (HAB) induces flocculation of the algae with the MPN composition and sedimentation of the resulting floc.

Brief Description of Related Technology

Harmful algal blooms (HABs) result from the rapid growth of algal cells that produce toxins and pose a serious threat to aquatic life, human health, fresh water, and marine water quality. Bloom events which occur in the Gulf of Mexico, colloquially known as the "red tide" due to the red discoloration of water, are produced by the dinoflagellate *Karenia brevis*. The organism releases brevetoxins which cause significant fish kill incidents.

One intensely studied method for treating HABs is the use of new and inexpensive materials to flocculate and sink HABs so that their photosynthetic mechanisms are impeded and the cells die. The use of clays to flocculate and sink HABs has been researched as a way to mitigate HABs. The approach relies on the attachment of clays to algal cells, resulting in heavy flocs that sink. However, the effectiveness of clay flocculation is low and often requires very high dosages.

Polyaluminum chloride (PAC), a highly cationic inorganic polymer has been adapted to turn clays into more effective flocculants, reducing the required flocculant dosage for effective removal of algal cells. However, there are ecological concerns about the use of PAC, exemplified by the possible toxic effects of aluminum on invertebrates such as *Daphnia magna.*

The use of some natural biodegradable materials as flocculants for effective removal of algal cells has been investigated. Chitosan, a cationic biodegradable natural polymer obtained from crustaceans, has been used as a sand modifier for the removal of algal cells. An approach is the use of *Moringa oleifera* coagulant extracted from the *Moringa oleifera* seeds that contain cationic proteins as a biodegradable modifier of local sand for the removal of cyanobacterial blooms. Additionally, tannins modified by the introduction of quaternary nitrogen groups to render them cationic have been used successfully to flocculate the cyanobacterium, *Microcystis aeruginosa.*

Coagulants such as alum and iron (III) chloride ($FeCl_3$) have also been used for the removal of algal cells.

Many of the approaches to sink HABs, especially those based on modified clays, rely on electrostatic interactions, which are significantly depressed in saline environments where the Debye length is small and electrostatic interactions are screened out.

Accordingly, improved methods and compositions to dissipate such harmful algal blooms and ameliorate their effects are needed, in particular in saline and brackish waters since several HABs including *K. brevis* are found in these environments.

SUMMARY

In one aspect, the disclosure relates to a metal phenolic network (MPN) composition for treating algae in an aqueous environment, the composition comprising: a metal phenolic network (MPN) film comprising a polyphenol (e.g., tannic acid) and a multivalent metal ion (e.g., $Fe^{3+}$) coordinated to the polyphenol; a secondary flocculant comprising at least one of clay particles (e.g., kaolinite or other clay nanosheet; halloysite or other nanotube) and an ionic flocculant (e.g., polyaluminum chloride (PAC)); and water; wherein the MPN composition is in the form of an aqueous suspension with the MPN film and the secondary flocculant dispersed in the water.

In a refinement, the polyphenol comprises tannic acid, and the multivalent metal ion comprises iron (III).

In a refinement, the secondary flocculant comprises the clay particles, and the clay particles comprise clay nanoplatelets.

In a refinement, the secondary flocculant comprises the clay particles, and the clay particles comprise clay nanotubes. In a further refinement, the MPN composition further comprises an algaecide contained within an interior volume of the clay nanotubes (e.g., a generally cylindrical interior lumen of the nanotube structure).

In a refinement, the secondary flocculant comprises the ionic flocculant, and the ionic flocculant comprises polyaluminum chloride (PAC; or aluminum chlorohydrate).

In a refinement, a weight ratio of the MPN film relative to the secondary flocculant is in a range of 0.1 to 10.

In a refinement, the MPN composition further comprises: a networking biopolymer (e.g., chitosan) comprising at least one hydrogen-bonding functional group (e.g., hydroxy and/or amino group), wherein the networking biopolymer forms bridging links between different MPN films via hydrogen-bonding between (i) the hydrogen-bonding functional group of the networking biopolymer and (ii) at least one hydrogen-bonding functional group of the MPN film (e.g., hydroxy and/or carbonyl group of the polyphenol). In a further refinement, the networking biopolymer comprises chitosan. Alternatively or additionally, a weight ratio of the MPN film relative to the networking biopolymer is in a range of 1 to 50.

In another aspect, the disclosure relates to a metal phenolic network (MPN) kit for treating algae in an aqueous environment, the kit comprising: an aqueous suspension comprising: (i) water, and (ii) a metal phenolic network (MPN) film or component thereof dispersed in the water, the MPN film comprising a polyphenol (e.g., tannic acid) and a multivalent metal ion (e.g., $Fe^{3+}$) coordinated to the polyphenol; and a secondary flocculant in the form of a dried powder, the secondary flocculant comprising at least one of clay particles (e.g., kaolinite or other clay sheet; halloysite nanotube (HNT)) and an ionic flocculant (e.g., polyaluminum chloride (PAC)). The various kit components can generally include one or more of the disclosed refinements for the MPN composition.

In another aspect, the disclosure relates to a method for treating algae in an aqueous environment, the method comprising: applying the MPN composition according to any of its variously disclosed embodiments to an aqueous environment containing algae (e.g., on a surface thereof, such as in the form of an algal bloom), thereby contacting the algae with the MPN composition and flocculating the algae (i) to form a floc comprising the MPN composition and a plurality of algal cells and (ii) to sediment the floc.

In a refinement, at least 80 wt. % of the algae in the aqueous environment treated by the MPN composition are captured and sedimented in the floc.

In a refinement, the algae are in the form of an algal bloom (or harmful algal boom; HAB) on a surface of the aqueous environment.

In a refinement, the algae are selected from the group consisting of cyanobacteria, dinoflagellates, and diatoms.

In a refinement, the aqueous environment is a freshwater marine environment.

In a refinement, the aqueous environment is a saltwater marine environment.

BRIEF DESCRIPTION OF THE DRAWINGS

For a more complete understanding of the disclosure, reference should be made to the following detailed description and accompanying drawings wherein.

DETAILED DESCRIPTION

The disclosure relates to a metal phenolic network (MPN) composition for treating algae in an aqueous environment, in particular to entrap/capture, flocculate, and settle or otherwise remove the algae from a location where it damages the aqueous environment and/or harms organisms in the aqueous environment. The MPN composition includes a metal phenolic network (MPN) film, a secondary flocculant such as a clay material or ionic flocculant, and (optionally) a networking biopolymer to link MPN film segments together for expanded coverage and capture efficiency. Application of the MPN composition to an aqueous environment, for example a marine environment containing a harmful algal bloom (HAB) induces flocculation of the algae with the MPN composition and sedimentation of the resulting floc. Algae removed from a surface region of the aqueous environment in this way eventually kills the algae at least due to a lack of sunlight, and reduces or eliminates the ability of the algae to further damage the aqueous environment until its eventual death.

Figure 2:
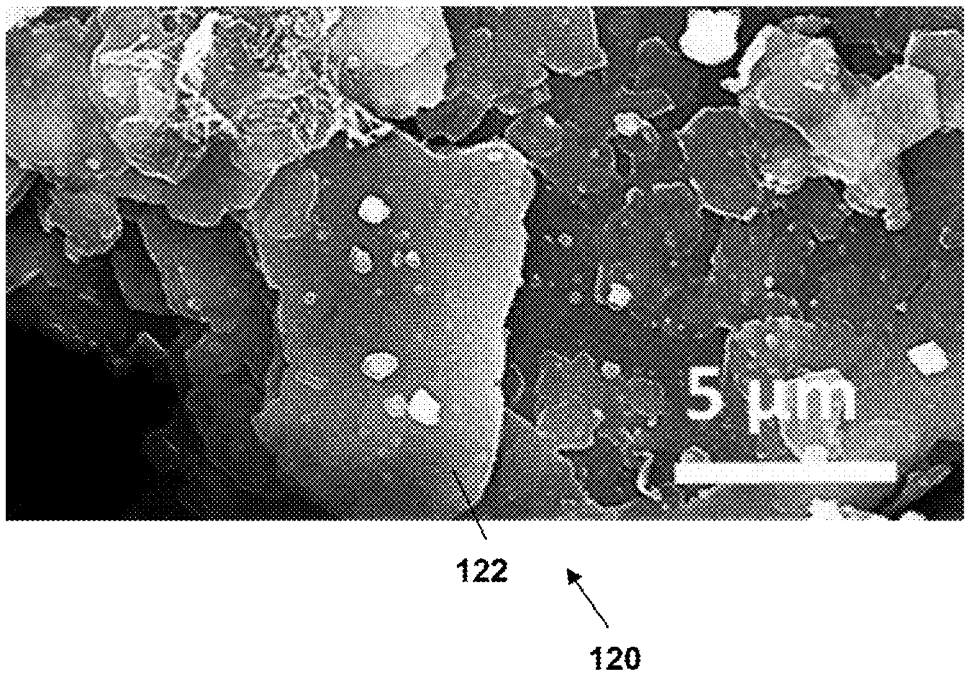
FIG. 2 is an SEM photograph illustrating a secondary flocculant in the form of clay nanoplatelets according to the disclosure (scale bar: 5 μm).
Figure 3:
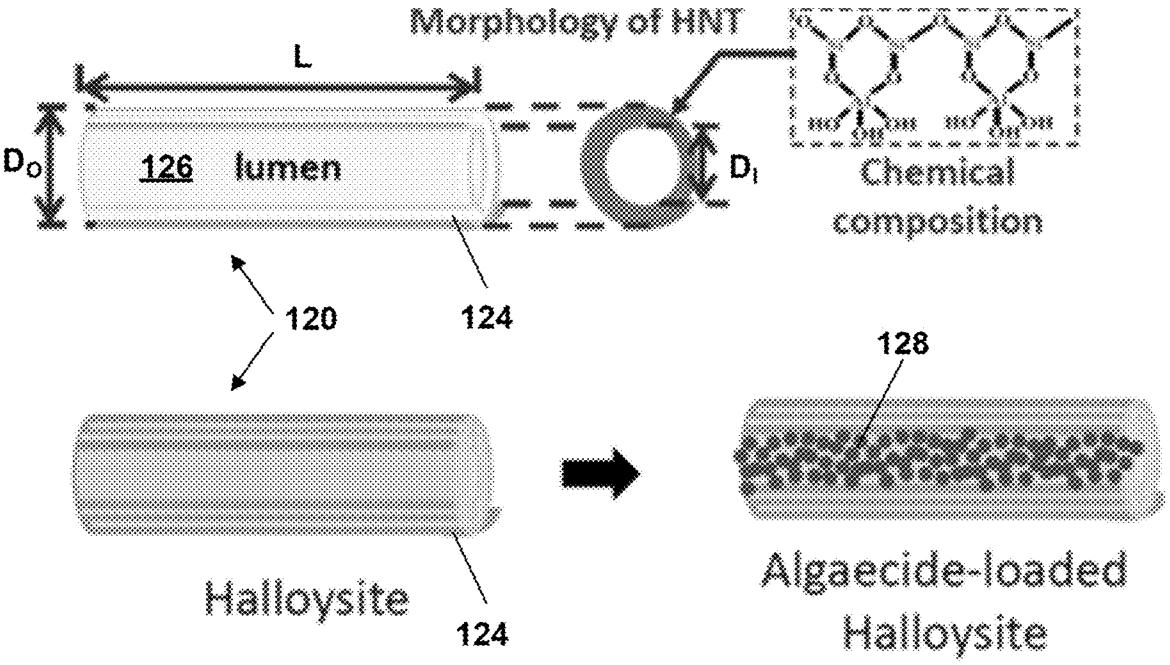
FIG. 3 illustrates a secondary flocculant in the form of clay nanotubes incorporating an algaecide according to the disclosure.
Figure 4:
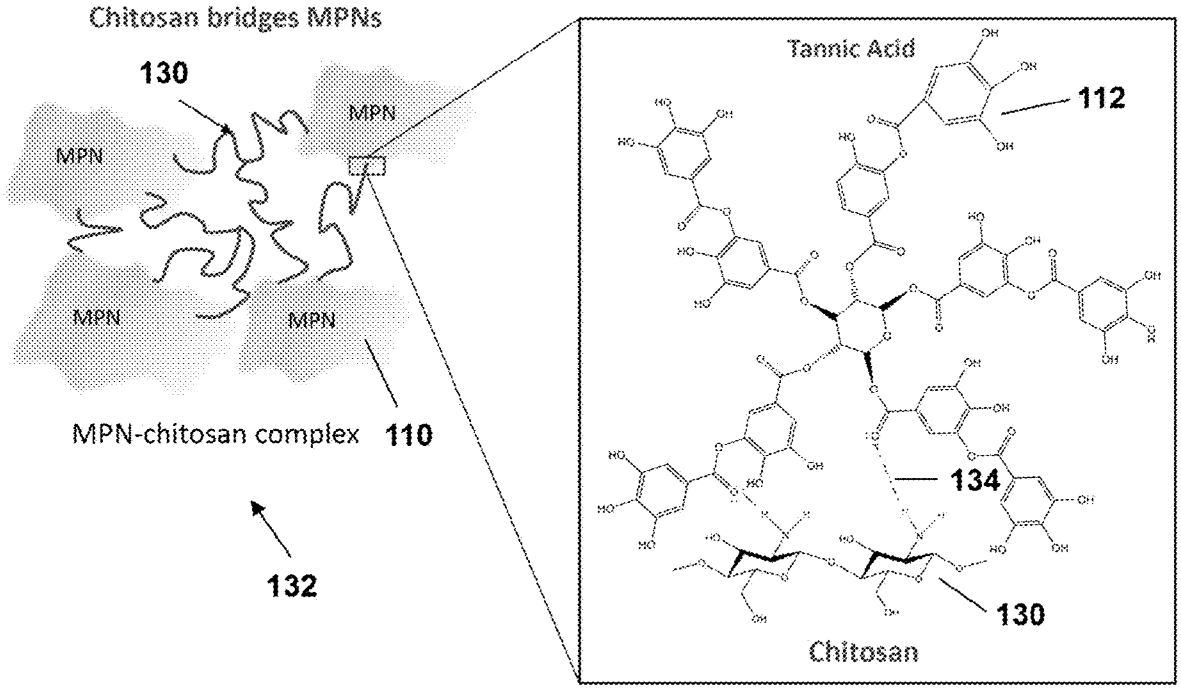
FIG. 4 illustrates an MPN film-networking biopolymer complex according to the disclosure, with the inset illustrating hydrogen-bonding interactions between the networking biopolymer and the polyphenol.
Figure 5:
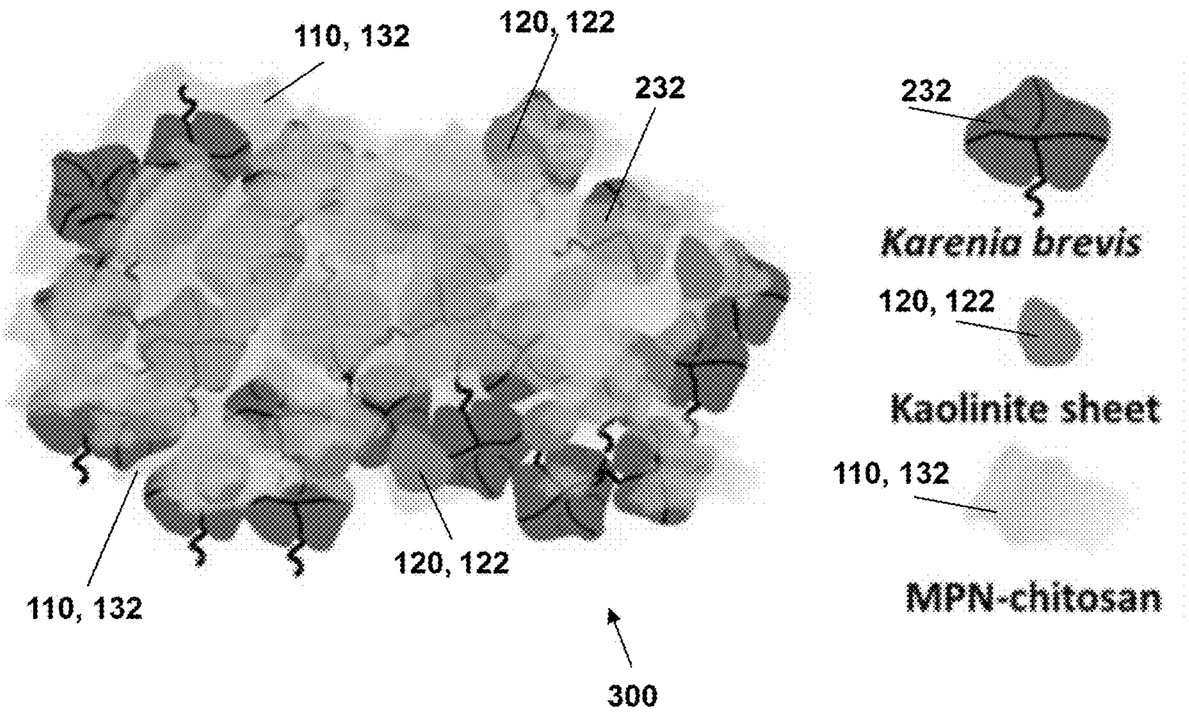
FIG. 5 illustrates a floc with captured algae formed from an MPN composition according to the disclosure.

As described in more detail below, the disclosed MPN compositions and related methods provide a simple, effective, and environmentally benign means to flocculate, sediment, and remove algae typical of harmful algal blooms (HABs), for example dinoflagellates such as *Karenia brevis*. The method uses a self-assembled network film called a metal phenolic network (MPN) film (FIG. 1), for example together with a small amount of a networking biopolymer such as chitosan to form an expanded-area MPN film-networking biopolymer complex (FIG. 4). With or without the networking biopolymer, the MPN film can form a shroud over algal cells in an aqueous environment leading to the formation of large flocs of these cells. A secondary flocculant such as a clay material (FIGS. 2 and 3) is incorporated into the MPN composition so that the corresponding films or shrouds to effectively sink the formed flocs (FIG. 5) due to the increased effective floc density provided by the higher density clay materials (i.e., relative to an aqueous environment). FIG. 5, described in more detail below, illustrates shroud formation over flocculated algae such as *K. brevis*. MPN films are metal organic frameworks that can be formed from a natural occurring polyphenol such as tannic acid (TA), coordinated with a metal ion (e.g., $Fe^{3+}$), both of which are intrinsically benign materials, and the corresponding MPN films have been shown to be biocompatible/non-cytotoxic. In the present disclosure, the MPN films are particularly useful for algal cell flocculation, because the multiple hydroxyl groups on the polyphenolic component of the film enable adhesion to surfaces, in particular an algal biological surface or a phospholipid-covered surface, a biomimetic aspect exemplified by the catechol-based proteins responsible for the underwater adhesive properties of mollusks. Bioadhesion is a consequence of hydrogen bonding, where multiple hydroxyl groups binding to surfaces facilitates enhanced adhesion via a dynamic process in which at least some hydroxyl groups remain attached to a surface when some other hydroxyl groups become free.

Metal Phenolic Network (MPN) Compositions

As generally illustrated in FIGS. 1-6, the disclosure relates to a metal phenolic network (MPN) composition 100 that can be used for treating algae 232 in an aqueous environment 200, for example by forming a sedimenting a floc 300 including the MPN composition 100 and plurality of algal cells 232 captured within the floc 300. The MPN composition 100 includes a metal phenolic network (MPN) film 110 and at least one secondary flocculant 120. In some embodiments, the MPN composition 100 further includes a networking biopolymer 130 that can form bridging links between individual MPN film 110 sheets to form a larger-area shroud in the form of an MPN film-networking biopolymer complex 132 for more efficient capture of algal cells 232 and correspondingly larger floc 300 formation. The MPN composition 100 suitably can contain water and be in the form of an aqueous suspension with the MPN film 110 (or corresponding complex 132) and the secondary flocculant 120 dispersed in the water.

As described in more detail below, the MPN composition can be used to flocculate, capture, sink, and/or kill algae in aqueous environment, for example a harmful algal bloom (HAB) in a freshwater or saltwater aquatic or marine environment. The MPN film serves as a primary flocculant: Free phenolic hydroxy groups from the polyphenol component of the MPN film can adhere, bind, or otherwise capture algal cells, for example via biomimetic hydrogen bonding interactions. In addition to aggregating algal cells in a floc, the MPN film also can capture and secure dinoflagellate algae that might otherwise escape the floc via their own propulsion. The secondary flocculant can include clay particles (e.g., in sheet or nanotube form) and/or ionic flocculants such as polyaluminum chloride (PAC). The secondary flocculant similarly can aggregate algal cells and further improve sedimentation of the formed flocs, thus improving the overall capture and removal efficiency of the target algae from the aqueous environment, for example by capturing and sedimenting algae from a marine environment surface to the marine floor, where the algae will eventually die from lack of sunlight and do not interfere with other (surface) marine organisms.

For example, clays included as a secondary flocculant can be incorporated into the MPN film that forms a shroud over and captures algal cells, and the relatively high density of the clay material (i.e., relative to the aqueous environment medium) increases the effective density of the floc as a whole, which in turn accelerates the sinking of the algal cell flocs once formed. The clays can bind to the MPN film via its polyphenol component, for example via hydrogen bonding. More specifically, clays are essentially silica, and the surfaces are populated by terminal silanol (Si—OH) groups. Polyphenol residues MPN film with free phenolic hydroxy groups (i.e., phenolic hydroxy groups not coordinated with the metal ion for film formation) can form hydrogen bonds with the silica surfaces via their silanol groups. The adhesion is strong since this is a dynamic phenomenon and, when one of the hydrogen bond comes free, there are a plurality of other available phenolic hydroxy groups to hold the polyphenol and MPN film in place on the clay surface.

PACs are representative ionic flocculants able to bind with algal cells to form flocs. PACs have the general formula $(Al_n(OH)_mCl_{(3n-m)})_x$ and have a polymeric structure with full water solubility. The length of the polymerized chain, molecular weight, and number of ionic charges is determined by the degree of polymerization. On hydrolysis, various mono- and polymeric species are formed, with $Al_{13}O_4(OH)_{24}^{7+}$ being a representative and particularly important cation. A less predominant species is $Al_8(OH)_{20}^{4+}$.

Figure 1:
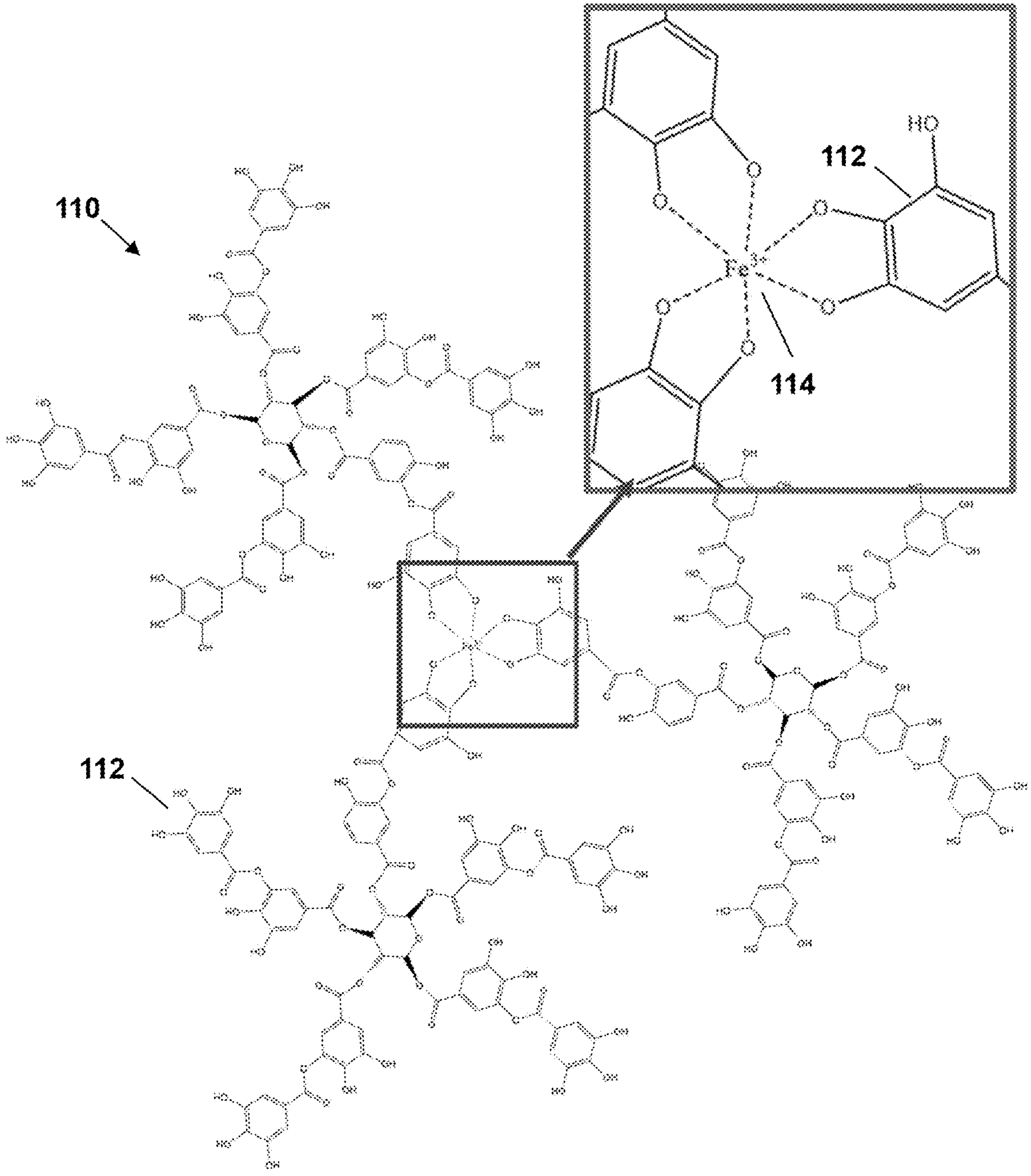
FIG. 1 illustrates a metal phenolic network (MPN) film according to the disclosure.

Metal phenolic network (MPN) films 110 are known in the art and generally include a polyphenol 112 component coordinated with a multivalent metal ion 114 coordinated to the polyphenol 112. The MPN film 110 is in the form of a sheet or film as an essentially two-dimensional metal organic framework with the metal ions 114 (e.g., $Fe^{3+}$, $Cu^{2+}$) coordinated to a plurality of polyphenol 112 moieties via phenolic hydroxy groups as illustrated in FIG. 1. The MPN films 110 spontaneously self-assemble in the presence of polyphenols and multivalent (e.g., trivalent or divalent) metal salts. The specific multivalent metals are not particularly limited, but preferably include metals that are environmentally benign after decomposition. The metal ions can be provided in any suitable (water) soluble salt (e.g., halide salts, polyatomic anion salts) for admixture and self-assembly with a polyphenol in (aqueous) solution. Examples of particularly suitable metals/metal ions include iron ($Fe^{3+}$), copper ($Cu^{2+}$), aluminum ($Al^{3+}$), and magnesium ($Mg^{2+}$). More generally, metals that can be used for MPN film formation include Al, Ba, Be, Ca, Cd, Ce, Cr, Cu, Eu, Gd, Ge, Ga, In, Ti, Mo, Mg, Mn, Ni, Ru, Rh, Sc, Si, Sn, Sr, Ti, Tb, V, Zn, Zr, Y, and mixtures thereof. The MPN film 110 includes phenolic hydroxy groups (i.e., that are not in metal ion complexation) that can bind strongly to various biological surface, thus forming adhesive molecular thin skins. The MPN film 110 can be formed from environmentally benign and non-cytotoxic materials, making it suitable for use in an aqueous environment to which its corresponding MPN composition 100 is applied with the intent to flocculate, sediment, and then remain on a marine bed where it eventually biodegrades after algal death.

Polyphenols generally include compounds with multiple phenol structural units (e.g., a C6 aromatic ring with at least one —OH phenolic hydroxy group on the ring) and/or multiple phenolic hydroxy groups, for example including a plurality of aromatic rings each having 2, 3, or more phenolic hydroxy groups, such as with at least 2 phenolic hydroxy groups in o-position relative to each other. For example, tannic acid is a plant-derived polyphenol formed by esterification of ten equivalents of gallic acid to a glucose core, thus having 10 phenol structural units and 25 phenolic hydroxy groups in its normal form. In embodiments, tannic acid or more generic tannins can be used a polyphenols for MPN film formation. More generally, polyphenolic compounds can include a plurality of phenol structural units, for example one or more of catechol, pyrocatechol, resorcinol, pyrogallol, catechin, epigallocatechin gallate, dopamine, and phloroglucinol units, which can be joined by ester bonds, carbon-carbon bonds, etc. Examples of phenolic acids that can form corresponding polyphenols (e.g., via esterification) include gallic acid (i.e., an acid including a pyrogallol unit), caffeic acid, vanillic acid, and p-cumaric acid. In a particular embodiment, the MPN film is formed from a plurality of tannic acid units coordinated via iron (III) trivalent metal ions.

The clay materials useful as the secondary flocculant 120 are not particularly limited, and can include, for example clay nanoplatelets 122 and/or clay nanotubes 124. Essentially any clays materials are suitable, regardless of their morphology, and they will complex the other MPN composition 100 components, including the MPN film 110 (e.g., via silanol-phenolic group interaction), PAC or other ionic secondary flocculants 120, and networking biopolymers such as chitosan (e.g., via hydrogen bonding). Clay surfaces in general are anionic, and by themselves they do not attach well to cells. Clays do, however, attach well to cationic materials such as PAC and chitosan (e.g., in ammonium form), and these cationic materials can also bind to cells. Clays are primarily used to accelerate sinking when incorporated into the MPN composition 100.

Clay materials suitable for use as the clay particles for the secondary flocculant 120 generally include hydrous aluminum phyllosilicates, for example having a nanoplatelet 122 structure or nanotube 124 structure. Clay materials can include halloysite, kaolinite, illite, montmorillonite, vermiculite, talc, sepiolite, palygorskite (or attapulgite), and pyrophyllite. Halloysite is an aluminosilicate clay mineral with the empirical formula $Al_2Si_2O_5(OH)_4.nH_2O$ (e.g., n=2), and it can occur intermixed with dickite, kaolinite, montmorillonite and other clay minerals. Halloysite is in the form as small cylinders (nanotubes) in which the outer surface is mostly composed of $SiO_2$ and the inner surface primarily of $Al_2O_3$. Halloysite is commonly found with kaolinite, both are which are hydrated aluminosilicate minerals. Halloysite ($Al_2Si_2O_5(OH)_4.2H_2O$) and kaolinite ($Al_2Si_2O_5(OH)_4$) have the same hydrated aluminosilicate formula, but halloysite has non-structural water intercalated between the aluminosilicate layers, which water causes a halloysite platelet to assume a tubular form (a "halloysite nanotube" or "HNT"), which is a natural nanotube. In contrast, kaolinite tends to remain in a planar, nanoplatelet form.

The nanotubes 124 and nanoplatelets 122 can be characterized by a variety of geometric/size parameters, for example corresponding to an average size property or size distribution property. The nanotubes 124, for example an HNT or otherwise, generally have a hollow, elongate tubular geometry defining an interior (cylindrical) lumen 126 into which an algaecide or other active ingredient can be loaded for release and targeted delivery into algal cells 232 once formed into a floc 300. The nanoplatelets 122, for example kaolinite or otherwise, generally have flat, planar shape with a high diameter:thickness aspect ratio.

In an embodiment, the nanotubes 124 can be characterized as having one or more of (i) an internal diameter $D_I$ in a range from 10 nm to 100 nm, (ii) an outer diameter $D_O$ in a range from 40 nm to 400 nm, and (iii) a length L in a range from 0.1 μm to 10 μm. For example, the internal diameter can be at least 10, 12, 15, 20, 25, 30, 40, or 50 nm and/or up to 30, 40, 50, 60, 70, 80, 90, or 100 nm. The outer diameter is larger than the internal diameter and can be at least 40, 50, 60, 80, 100, 150, or 200 nm and/or up to 50, 60, 80, 100, 150, 200, 250, 300, or 400 nm. The wall thickness (i.e., half the difference between outer and inner diameters) can be at least 5, 7, 10, 12, 15, 20, or 25 nm and/or up to 20, 25, 30, 40, 60, 80, 100, 120, or 150 nm. The length can be at least 0.1, 0.2, 0.5, 1, 1.2, 1.5, 2, or 4 μm and/or up to 1, 2, 4, 6, 8, or 10 μm. The aspect ratio (i.e., length divided by outer diameter) can be at least 5, 10, 20, 40, 60, 80, or 100 and/or up to 20, 50, 100, 200, 500, or 1000. In an embodiment, the nanoplatelets 122 can be characterized as having one or more of (i) a thickness in a range from 10 nm to 100 nm, and (ii) a diameter/width in a range from 0.1 μm to 10 μm. For example, the thickness can be at least 10, 12, 15, 20, 25, 30, 40, or 50 nm and/or up to 50, 60, 70, 80, 90, or 100 nm. The diameter/width can be at least 0.1, 0.2, 0.5, 1, 1.2, 1.5, 2, or 4 μm and/or up to 1, 2, 4, 6, 8, or 10 μm. The aspect ratio (i.e., diameter/width divided by thickness) can be at least 5, 10, 20, 40, 60, 80, or 100 and/or up to 20, 50, 100, 200, 500, or 1000. The foregoing ranges can represent a distribution property of the nanoparticles, for example a size range within which at least 90, 95, 98, or 99% of the nanoparticles fall, for example on a number, weight, or volume basis. Similarly, a number-, weight-, or volume-average size (e.g., length, diameter, etc.) of a given clay nanoparticle can be within the foregoing ranges.

In an embodiment, the MPN composition 100 can further include an algaecide 128 contained within the interior volume or lumen 126 of the clay nanotubes 124. The algaecide 128 typically is slowly released from the lumen 126. Given the relatively rapid timescale on which flocs 300 form to shroud or encapsulate algal cells 232 with the MPN composition 100, a substantial fraction of the algaecide 128 is released while in floc 300 form, which in turn preferentially targets encapsulated algal cells 232 in the floc 300 with the algaecide 128.

The algaecide is not particularly limited and can generally include any material that can kill and/or prevent growth of algae. Even though sedimentation of the algal floc eliminates or sufficiently reduces exposure to sunlight to eventually kill the algae, it can be desirable to include an algaecide that accelerates the algal death rate relative to lack of sunlight alone. This is because some types of algae under the abiotic stress of low sunlight conditions can produce and release toxins harmful to the aquatic environment while the algae are still living. Additionally, to the extent that some algae might be prone to release or escape from the floc over time, inclusion of an algaecide limits the timescale over which this might happen, thus converting a high initial capture efficiency to a correspondingly high eventual kill efficiency.

The algaecide can be a naturally occurring material or a synthetic material, although naturally occurring materials having algaecide activity are preferred, in particular when such natural materials are biodegradable in the aquatic environment to which the MPN composition is applied. The algaecide is generally inserted, sequestered, or otherwise contained within the interior volume of the clay nanotubes. Upon addition to an aqueous medium (e.g., shortly before application to an algal target) and preferably when in contact with target algae, the algaecide is released from the interior volume where it preferentially contacts and acts upon algal cells captured in the MPN-based floc. This also limits exposure of other aquatic organisms to the algaecide, which other organisms are generally outside the floc. An example of a suitable algaecide is tannic acid. In an embodiment, tannic acid is inserted into the interior volume of the clay nanotubes and then sealed at opposing ends of the clay nanotubes by contact with multivalent metal ions to form a thin MPN sealing film at the ends of the clay nanotube lumens. The thin MPN sealing film is eventually released along with the internal tannic acid upon contact with water. Other useful environmentally benign algaecides include polyphenols and flavonoids more generally. Copper sulfate can be used as an algaecide. Calcium peroxide ($CaO_2$) can be used as an algaecide loaded within the nanotube lumen. Calcium peroxide releases hydrogen peroxide ($H_2O_2$) upon hydrolysis with water, and hydrogen peroxide is considered an algaecide, in which case calcium peroxide within the nanotube lumen can serve as a means for controlled release of hydrogen peroxide after application to an aqueous environment.

In addition or as an alternative to clay materials, the secondary flocculant can include one or more ionic flocculants, for example those commonly known in the art as clarifying agents. In an embodiment, the secondary flocculant include polyaluminum chloride (PAC; or aluminum chlorohydrate). Other suitable secondary flocculants or clarifying agents can include one or more of alum, aluminum sulfate, calcium oxide, calcium hydroxide, iron (II) sulfate, iron (III) chloride, polyacrylamide, poly(diallyldimethylammonium chloride), sodium aluminate, sodium silicate, gelatin, guar gum, and/or alginates.

The absolute concentrations or amounts of the MPN film 110 and the secondary flocculant 120 in the MPN composition 100 is not particularly limited and can be selected depending on the intended use of the MPN composition 100. For example, a relatively concentrated suspension of the MPN composition 100 can be suitable for storage/transport, the composition 100 would be intended to be diluted prior to application in the target area. Likewise, a relatively dilute suspension of the MPN composition 100 is appropriate when the composition 100 components have a suitable concentration for spraying/application onto the target algae 232. For example, a concentrated aqueous suspension suitable for storage/transport can include the MPN film 110 at concentration of 20-1000 mg/mL or 50-200 mg/mL. In some embodiments, the MPN film 110 can transported as separate concentrated suspensions of its corresponding polyphenol 112 and multivalent metal 114 salt, whereupon the MPN film 110 rapidly self-assembles when the components are combined, for example dilution and just prior to use on a target area. Similarly, a concentrated aqueous suspension suitable for storage/transport can include the secondary flocculant 120 at concentration of 20-1000 mg/mL or 50-200 mg/mL. Suitable use concentrations for spraying/application to target algae can include the MPN film 110 at concentration of 0.1-50 mg/mL or 1-5 mg/mL and/or the secondary flocculant 120 at concentration of 0.1-50 mg/mL or 1-5 mg/mL. Alternatively or additionally, the MPN composition 100 can include the MPN film 110 and the secondary flocculant 120 in relative amounts such that a weight ratio of the MPN film 110 relative to the secondary flocculant(s) 120 is in a range of 0.1 to 10, for example at least 0.1, 0.2, 0.3, 0.5, 0.7, 1, 1.2, 1.5, 2, 3, or 5 and/or up to 0.3, 0.5, 0.7, 1, 1.2, 1.5, 2, 3, 4, 6, 7, 8, or 10.

As discussed above, in some embodiments, the MPN composition 100 can further include a networking biopolymer 130. The networking biopolymer 130 includes at least one hydrogen-bonding functional group, such as one or more hydroxy and/or amino groups. The networking biopolymer 130 forms bridging links between different MPN films 110 via hydrogen-bonding between the hydrogen-bonding functional group of the networking biopolymer 130 and at least one hydrogen-bonding functional group of the MPN film, such as a hydroxy and/or carbonyl group of the polyphenol. The MPN film 110 of the MPN composition 100 is generally in the form of a film or sheet including multiple polyphenolic units 112 linked together via central multivalent metal ions 114 coordinated to the polyphenols 112, for example via two adjacent (or ortho) phenolic hydroxy groups on a single aromatic substrate. The inclusion of the networking biopolymer 130 can further increase the capture efficiency of the MPN film 110 by linking together individual metal/polyphenol film units 110 into a MPN film-networking biopolymer complex 132 to increase the size and expanse of the shroud or sheet structure of the MPN composition 100. This increased larger-area shroud more efficiently captures algal cells 232 and forms correspondingly larger flocs 300, which in turn increases both removal efficiency and sedimentation rate. For example, an MPN film 110 with the networking biopolymer 130 can have a typical diameter or width of about 100-500 μm, while a corresponding complex 132 can have a typical diameter or width of about 1000-5000 μm.

The networking biopolymer is not particularly limited and suitably includes polysaccharides that include pendant functional groups capable of forming hydrogen bonds with complementary functional groups in the MPN polyphenolic units. The networking biopolymer is generally naturally derived, environmentally benign, and susceptible to eventual biodegradation after application to an aqueous environment (e.g., after treatment, flocculation, and/or killing of targeted algae therein). The pendant functional groups capable of forming hydrogen bonds in the networking biopolymer can include hydroxy groups, amino groups, carboxylate groups, sulfate groups, etc. Examples of suitable networking biopolymers include chitosan, alginate/alginic acid, cellulose, and derivatives thereof (e.g., alkyl esters, alkyl ethers, hydroxyalkyl ethers, carboxyalkyl ethers, etc. of the various biopolymers). The networking biopolymer can have a molecular weight in a range from 1000 to 500,000 g/mol. Alternatively or additionally, the networking biopolymer can include 5 to 5000 repeat units (e.g., saccharide monomer units).

In an embodiment, the networking biopolymer includes chitosan. Chitosan is a linear polysaccharide composed of acetylated (N-acetyl-D-glucosamine) and deacetylated (β-(1→4)-linked D-glucosamine) glucosamine units. Chitosan generally includes hydroxy and amino pendant functional groups for hydrogen bonding and linking of MPN sheets. In some embodiments, the amino groups can be in a neutral or amine form (e.g., —$NH_2$), a cationic or ammonium form (e.g., —$NH_3^+$), or both. For example, at least some of the —$NH_2$ groups normally in chitosan can be converted to corresponding —$NH_3^+$ groups, such as by acidification with acetic acid or otherwise to promote water-solubility of the chitosan in the aqueous medium of the MPN composition.

As discussed above for the MPN film 110 and the secondary flocculant 120, the absolute concentration or amount of the networking biopolymer 130 in the MPN composition 100 is not particularly limited and can be selected depending on the intended use of the MPN composition 100 (e.g., as a concentrated or dilute suspension). In an embodiment, the MPN composition 100 can include the MPN film 110 and the networking biopolymer 130 in relative amounts such that a weight ratio of the MPN film 110 relative to the networking biopolymer 130 is in a range of 1 to 50, for example at least 1, 2, 3, 5, 7, 10, 15, 20, or 30 and/or up to 3, 4, 6, 8, 10, 20, 30, 40, or 50.

The disclosure further relates to a metal phenolic network (MPN) kit for treating algae in an aqueous environment. The kit generally includes one or more aqueous suspension including a water suspending medium and a metal phenolic network (MPN) film or component thereof dispersed in the water. The MPN film can be in any of the embodiments described above for the corresponding MPN composition. In an embodiment, the aqueous suspension of the kit can include the MPN film in an already self-assembled form between the polyphenol and multivalent metal. In another embodiment, the kit can include at least two aqueous suspensions: one containing the polyphenol and one containing the multivalent metal, whereupon the aqueous suspensions are mixed to form the MPN film prior to use. The kit further includes a secondary flocculant in the form of a dried powder, for example a clay material or an ionic flocculant as described above.

The MPN kit represents an embodiment in which the MPN suspension is provided separately from a secondary flocculant, where the secondary flocculant is intended to be added to the aqueous suspension just prior to application to an aqueous environment to treat algae therein. This can be desirable, for example, when the secondary flocculant contains an algaecide or other active ingredient for delayed release upon contact with algae, which active ingredient would otherwise be susceptible to leaching from the secondary flocculant during prolonged storage in the aqueous suspension prior to use. Examples of such secondary flocculants include HNTs with the active ingredient loaded into the HNT lumen. The aqueous suspension can include other components as described above for the MPN composition, for example a networking biopolymer and/or other secondary flocculants that are not subject to degradation or loss of activity during storage in water (e.g., kaolinite or other clay sheets, HNTs without an active component, ionic flocculants, etc.).

Methods of Use

Figure 6:
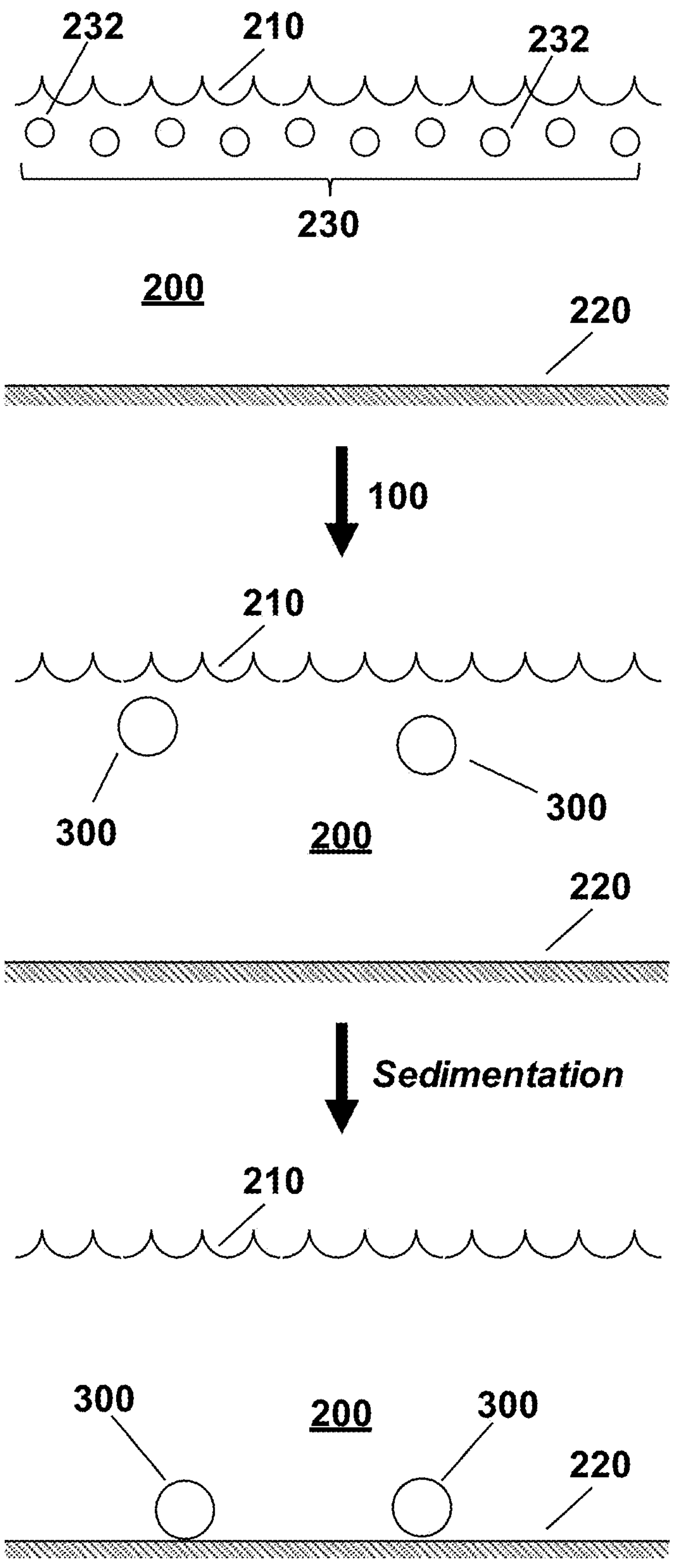
FIG. 6 illustrates a method for treating algae in an aqueous environment using an MPN composition according to the disclosure.

As illustrated in FIG. 6, the disclosure also relates to methods for treating algae 232 in an aqueous environment 200. The MPN composition 100 in any of its variously disclosed embodiments is applied to an aqueous environment 200 containing algae 232, for example at or near a (top) surface 210 of the aqueous environment 200. The MPN composition 100 contacts the algae 232, whereupon it captures, encapsulates, and flocculates the algal cells 232 to form a floc 300 of the MPN composition 100 and a plurality of captured algal cells 232. The floc 300 is generally in the form of an MPN film 100 (or complex 132) shroud or matrix encasing the aggregated algal cells 232 and the secondary flocculant 120. The floc 300 then sediments away from the surface 210. Sedimentation generally includes settling of the floc 300 via gravity to or toward the marine floor or bottom 220, where the algae 232 are eventually killed due to lack of sunlight and any algaecide (if present), followed by the eventual biodegradation of the various MPN composition 100 components.

The MPN composition 100 effectively removes a substantial amount of the algae 232 from the aqueous environment 200. The flocculated algae 232 remains in the aqueous environment 200, but it is removed away from the surface 210 region of the environment 200 (i.e., where it would otherwise continue to receive sunlight, grow, and consume/deplete dissolved oxygen) toward a deeper region of the environment 200 where it eventually dies from sunlight deprivation. In an embodiment, at least 80 wt. % of the algae 232 in the aqueous environment 200 treated by the MPN composition 100 are captured and sedimented in the floc 300, for example removing at least 80, 85, 90 or 95% and/or 90, 95, 98, 99, or 100% of the algae 232 from the region of the aqueous environment 200 where it can damage other aquatic life.

The algae 232 are typically localized and concentrated near the surface 210 of the aqueous environment 200, such as in the form of an algal bloom or harmful algal bloom 230 (HAB). An algal bloom 230 can be characterized by a very high surface concentration of algae that forms an essentially continuous sheet or layer of algal biomass at the surface. The presence of an HAB 230 can substantially lower oxygen levels in the aqueous environment 200, thus killing or damaging marine life. Some algal species associated with an HAB 230 can produce algal toxins. Oxygen depletion resulting from untreated HABs 230 can create marine zone in which fish and aquatic plants are unable to grow or survive. Classes of algae 232 typical of HABs 230 include cyanobacteria, dinoflagellates, and diatoms. HABs 230 in freshwater lakes and rivers, or at estuaries, where rivers flow into the ocean, can be caused by cyanobacteria (or "blue-green algae"), and they can produce hazardous toxins. HABs 230 in saltwater marine environments, such as ocean coastlines or bays, can be caused by diatoms and dinoflagellates (or "red tides"), and they similarly can produce hazardous toxins.

The aqueous environment 200 to which the MPN composition 100 is applied is not particularly limited and can include any water system or environment containing algae 232 therein, for example including a freshwater marine environment or a saltwater marine environment. Example freshwater marine environments include lakes, ponds, rivers, etc. Example saltwater marine environments include open or coastal seas or oceans, brackish waters (e.g., estuaries), etc.

EXAMPLES

The following examples illustrate the disclosed compositions and methods, but are not intended to limit the scope of any claims thereto.

Example 1—MPN/Kaolinite Compositions for Capture of *K. brevis*

Example 1 illustrates the formation and use of an MPN composition according to the disclosure and using environmentally benign materials to effectively flocculate and sink the dinoflagellate *Karenia brevis* that is representative of algae present in harmful algal blooms (HAB). Flocculation is accomplished using a metal organic framework including a metal phenolic network (MPN) and small amounts of chitosan as a networking biopolymer form a corresponding MPN film-networking biopolymer complex that in turn forms a thin shroud over *K. brevis* cells and clay particles. The MPN film is composed of a natural occurring polyphenol tannic acid (TA), coordinated with a metal ion ($Fe^{3+}$). Anchoring of the shroud is through the bioadhesion mimetics of polyphenol hydrogen bonding to surfaces. The chitosan networking biopolymer form bridges between MPN film complexes through hydrogen bonding, extending the areal coverage of the shroud significantly and resulting in highly efficient flocculation. The clay particles (kaolinite sheets) are also embedded in the shroud and facilitate sinking, and over 94% of *K. brevis* cells are removed after the application of the kaolinite-MPN-chitosan mixture. Scanning electron microscopy reveals capture and entrapment of the cells within the shroud. The mesh-like structures of MPNs inhibit the escape and regrowth of *K. brevis* cells from the flocs. The method can be applied on a larger scale in a marine environment for algal cell flocculation over larger areas for HAB mitigation.

Materials: *K. brevis* cells was purchased from the National Center for Marine Algae and Microbiota at Bigelow Laboratory (NCMA-CCMP2281). Tannic acid, iron (III) chloride hexahydrate ($FeCl_3.6H_2O$), high molecular weight chitosan (310-375Kda), kaolinite and sodium hydroxide (50%) were purchased from Sigma Aldrich. Deionized (DI) water generated by an ELGA reverse osmosis water purification system (MEDICA 15BP) with a resistance of 18.2 MΩ·cm was used.

*K. brevis* Culture: *K. brevis* cells were cultured in L1-medium made with filtered seawater (0.2 μm pore-size cellulose nitrate membranes) collected from the Gulf of Mexico, Louisiana coastal waters. The media was autoclaved prior to being added to the *K. brevis* cells. The culture was maintained at 25° C. under cool white fluorescent light on a 12 h light and 12 h darkness regimen in an illumination-controlled incubator (Percival Boone Iowa 50036 I-30BL). Removal experiments were performed using cultures in early stationary growth stage when the cell cultures have attained a sufficient cell density for flocculation experiments (at least about 3.0-3.5×$10^5$ cells/mL).

Flocculants: The clay slurry was prepared by suspending the clay powder in deionized (DI) water at a 5 mg/mL concentration. Metal phenolic networks (MPNs) were prepared by sequentially adding 10 mL of tannic acid stock solution (40 mg/mL in DI water) and 10 mL of iron (III) chloride stock solution (20 mg/mL in DI water). The resulting solution was then diluted with deionized water to obtain a final concentration of 10 mg/mL. The chitosan flakes were dissolved in 0.5% acetic acid at a concentration of 5 mg/mL. This solution was then diluted with deionized water to obtain a final concentration of 1 g/L. The kaolinite-chitosan slurry was prepared by adding the appropriate amount of kaolinite to the chitosan solution prepared at 1 g/L concentration. The kaolinite-MPN-chitosan mixture was prepared by adding the appropriate amount of MPN (10 mg/mL) to the kaolinite-chitosan slurry. The resulting suspension was vortex mixed for 30 seconds.

*K. brevis* Flocculation: The initial cell concentrations of *K. brevis* cells were 3.0–3.2×$10^5$ cells/mL. The pH of the experimental culture was adjusted to 8.2 by adding 0.2 mol/L NaOH or 0.2 mol/L HCl solution prior to flocculation experiments. 1 mL of the *K. brevis* cell culture was transferred into a 1.75 mL vial (2.8 cm in height), resulting in a 1.4 cm sedimentation height. All flocculation experiments were conducted at a kaolinite dosage of 100 mg/L. Increasing amounts of MPNs (MPN dosages between 25 mg/L to 200 mg/L) were combined with kaolinite (100 mg/L) to obtain kaolinite-MPN mixtures. Chitosan at 10 mg/L and 20 mg/L dosages was combined with kaolinite or kaolinite-MPN mixtures. The different flocculant mixtures (kaolinite, kaolinite-MPN and kaolinite-MPN-chitosan) were added to the *K. brevis* culture. The pH of the *K. brevis* culture was between 7.1 and 8.2 after flocculation with kaolinite, kaolinite-MPN, or kaolinite-MPN-chitosan. The solutions were stirred at 300 rpm for 10 min and were kept standing after mixing. The supernatant was collected at 0.2 cm below the water surface to determine the algal cell density, which was enumerated in a cell counting chamber using an AmScope T600C Advanced Trinocular Compound Microscope after being fixed by Lugol solution. The removal efficiency of cells was calculated as (initial cell concentration-sample cell concentration)/initial cell concentration ×100%. All the flocculation experiments were conducted in triplicate and the results were presented as the mean values. After the flocculation experiments, the flocs were carefully transferred on a glass slide and then imaged using an AmScope T600C Advanced Trinocular Compound Microscope.

*K. brevis* Recovery: After flocculation and 2 hours sedimentation of *K. brevis* cells (1.6×$10^5$ cells/mL) using different flocculant mixtures (kaolinite, kaolinite-chitosan, kaolinite-MPN and kaolinite-MPN-chitosan), the vials were maintained at 25° C. under cool white fluorescent light on a 12 h light and 12 h darkness regimen in an illumination-controlled incubator. A culture of *K. brevis* without flocculation was set as control. Recovery of *K. brevis* cells was monitored by counting the cell numbers in the supernatant within the next 10 days.

Analytical Methods: Infrared spectra were recorded on a Nicolet iS50R Fourier transform infrared spectroscopy (FTIR). Samples were freeze dried, homogeneously mixed with potassium bromide (KBr) powder and compressed into pellets prior to characterization. *K. brevis* cells and flocs were imaged by cryogenic scanning electron microscopy (cryo-SEM). Prior to imaging, the samples were frozen. The following procedure was used to freeze the samples. Briefly, the samples were carefully transferred onto the cryo-SEM sample holder after flocculation and sedimentation. The samples were frozen by submersion into slushed liquid nitrogen. Freezing was followed by sublimation of the solvent at −95° C. for 10 minutes to remove surface vitrified water. The temperature was lowered back to −130° C., and the sample was then sputtered with a gold-palladium composite at 10 mA for 88 seconds followed by 44 seconds before imaging.

Figure 7:
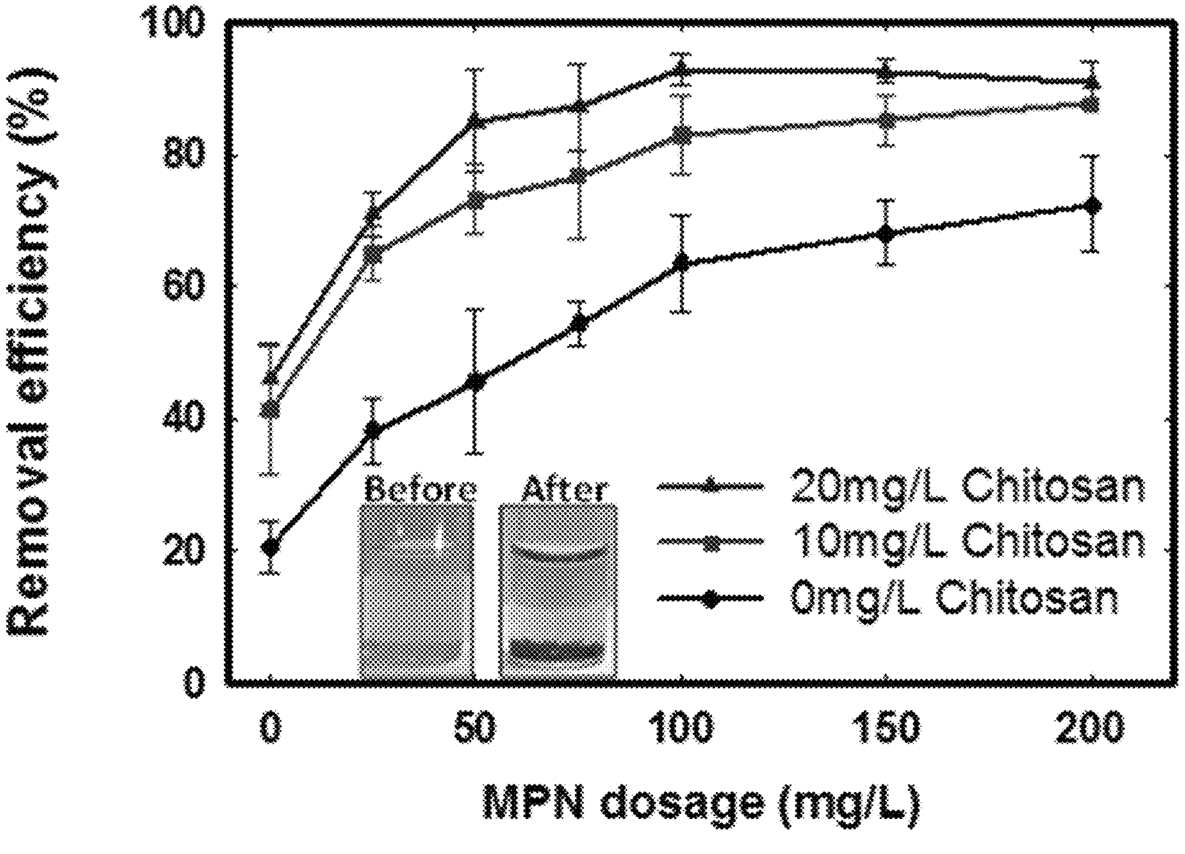
FIG. 7 is a graph showing removal efficiency of *K. brevis* from aqueous test samples using MPN compositions according to the disclosure as a function of MPN composition dosage and amount of networking biopolymer (chitosan).

Results—Removal Efficiency: FIG. 7 shows the removal efficiency of the flocculation and sinking of *Karenia brevis*. More specifically, FIG. 7 shows the effect of MPN, chitosan and MPN-chitosan dosages added to 100 mg/L kaolinite for the removal of *Karenia brevis* cells. Insets are photographs of *Karenia brevis* culture before and after flocculation with a mixture of kaolinite-MPN-chitosan at a dosage of 100 mg/L kaolinite+100 mg/L MPN+20 mg/L chitosan. Initial cell densities varied from 3.0×$10^5$ cells/mL to 3.2×$10^5$ cells/mL. The flocculation experiments were done with a kaolinite background level of 100 mg/L. In the absence of any MPN (kaolinite alone), 20% of *K. brevis* cells are removed after 2 hours, indicating a low efficiency with clays alone. Upon inclusion of chitosan, 46% of *K. brevis* cells are removed at a dosage of 20 mg/L chitosan plus 100 mg/L kaolinite, demonstrating that the addition of only chitosan to kaolinite is not sufficient to achieve high cell removal efficiencies.

The addition of the MPN film significantly improves *K. brevis* cell removal efficiencies. The removal efficiency increases steadily with the dosage of MPN and asymptotically levels off to around 74% at a dosage of 200 mg/L (FIG. 7). Sinking efficiencies are further enhanced by the addition of small amounts chitosan to the kaolinite-MPN mixture and up to 94% efficacy can be obtained with the addition of 20 mg/L chitosan. The inset to FIG. 7 shows representative experimental systems and it is qualitatively evident that the media visibly clears after flocculation and sedimentation of *K. brevis*.

The removal of *K. brevis* using a kaolinite-MPN-chitosan mixture at a dosage of 100 mg/L kaolinite+100 mg/L MPN+20 mg/L chitosan was also evaluated over a range of *K. brevis* cell densities (9.3×$10^4$ to 3.5×$10^5$ cells/mL) to determine the dependence of flocculation on *K. brevis* cell density. Less than 12% of *K. brevis* cells were removed in all the control experiments (i.e., *K. brevis* cells without clay or flocculant treatment). In contrast, more than 93% of *K. brevis* cells were removed by the kaolinite-MPN-chitosan mixture at all the *K. brevis* cell densities assessed.

Figure 8:
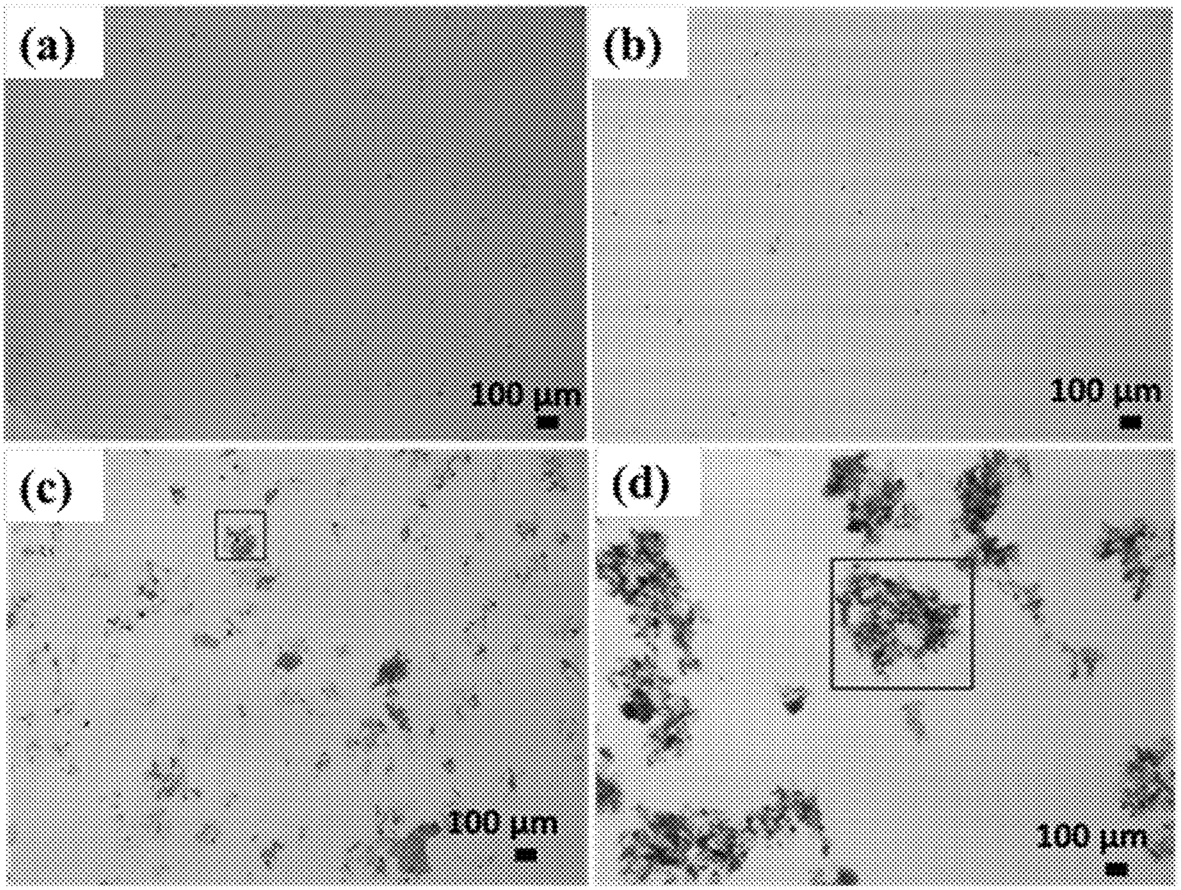
FIG. 8 includes a series of optical images showing *Karenia brevis* cells in a test sample (a) before flocculation, (b) after the addition of kaolinite at a dosage of 100 mg/L, (c) after the addition of kaolinite-MPN mixture at a dosage of 100 mg/L kaolinite+100 mg/L MPN, and (d) after the addition of kaolinite-MPN-chitosan mixture at a dosage of 100 mg/L kaolinite+100 mg/L MPN+20 mg/L chitosan (scale bars: 100 μm).

Results—Floc Formation: FIG. 8 shows optical micrographs of the flocs obtained in the different systems. In an initial test sample prior to addition of any flocculant, *K. brevis* cells are essentially non-aggregated (FIG. 8, panel (a)) and remain so upon addition of kaolinite alone (FIG. 8, panel (b)). After the addition of MPN composition including the MPN film and kaolinite, the formation of flocs is clearly observed with a width or diameter on the order of up to about 100 μm (rectangular region, about 11 captured *K. brevis* cells), with the dark spots within the flocs showing captured *K. brevis* cells (FIG. 8, panel (c)). With the addition of a small amount of chitosan (1:5 weight ratio of chitosan to MPN) along with the MPN film and kaolinite, the floc sizes increase significantly (FIG. 8, panel (d)) with a width or diameter on the order of up to about 500 μm (rectangular region, about 33 captured *K. brevis* cells), and it is possible to entrap far more cells into this extended network.

FTIR characterizations were performed to evaluate the possible presence of hydrogen bonding interactions in a network between chitosan bridging MPN films through hydrogen bonding between the donor amine groups of chitosan and acceptor carboxyl and hydroxyl groups of tannic acid. The FTIR spectra of MPN-chitosan mixtures were obtained at the MPN:chitosan weight ratios of 5:1 and at a 2:1 weight ratio, where efficient removal of algal cells was observed. The FTIR spectra (not shown) were indicative of the formation of hydrogen bonds, and the chitosan networks were determined to form bridges between MPN complexes through hydrogen bonding, extending the areal coverage of the shroud significantly and resulting in the increased removal efficiencies shown in FIG. 7.

Figure 9:
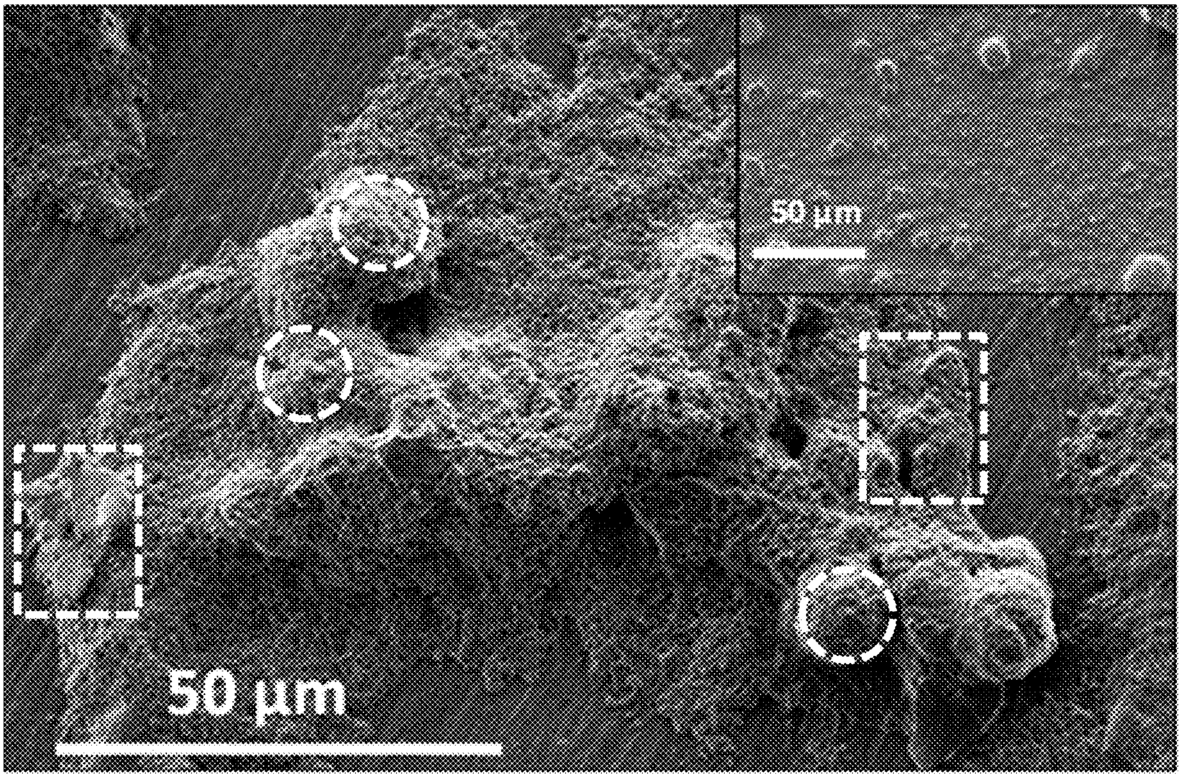
FIG. 9 is a cryogenic scanning electron microscopy (cryo-SEM) image showing the morphology of trapped *K. brevis* cells within the MPN-chitosan complexes (scale bars: 50 μm).

Cryogenic scanning electron microscopy (cryo-SEM) was used to characterize the morphology of the trapped *K. brevis* cells within the MPN-chitosan complexes. FIG. 9 illustrates that the kaolinite-MPN-chitosan forms a shroud over *K. brevis* cells. The main panel of FIG. 9 is a cryo-SEM image of *K. brevis* cells entrapped within a shroud after the addition of a kaolinite-MPN-chitosan mixture at a dosage of 100 mg/L kaolinite+100 mg/L MPN+20 mg/L chitosan. Dashed-line circles highlight regions of *K. brevis* cells trapped in the shroud and dashed-line rectangles highlight regions where kaolinite sheets are also integrated into the shroud. The inset panel of FIG. 9 shows the cryo-SEM image of *K. brevis* cells without the addition of any flocculants and the absence of aggregated cells. The entrapped *K. brevis* cells are covered by a gauzy shroud-like envelope, and kaolinite particles are trapped within the MPN-chitosan matrix and thus integrated into the shroud.

Figure 10:
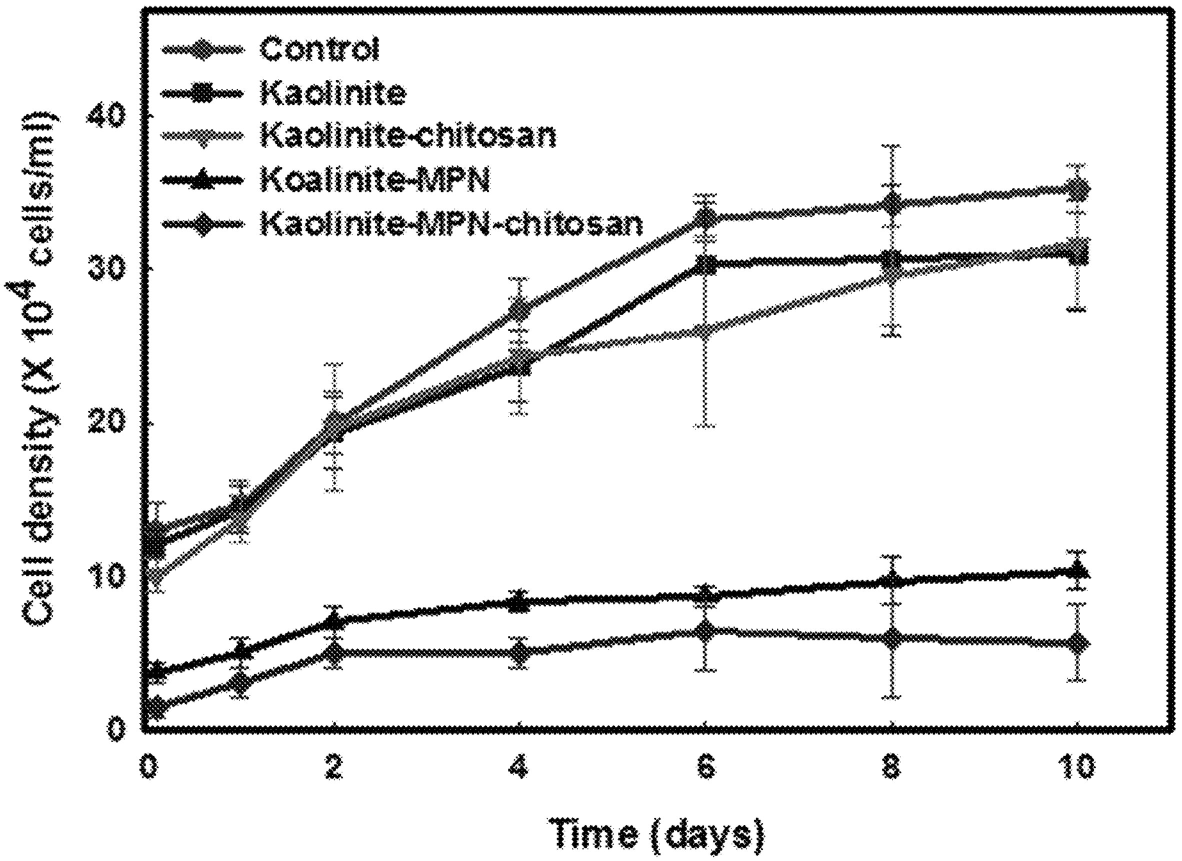
FIG. 10 is a graph showing retention efficiency of *K. brevis* from aqueous test samples after flocculation and sedimentation using various control compositions and MPN compositions according to the disclosure.

Results—Retention Efficiency: In HAB cell flocculation and sinking, an important issue is the potential escape and recovery of *K. brevis* cells from the flocs. Experiments were performed to evaluate whether the mesh-like adhesive structure of MPN films and compositions would retard such escape, which cell retention in turn reflects an additional advantage of the disclosed compositions beyond their ability to efficiently initially capture and remove cells via flocculation. The experiments evaluated the escape characteristics of *K. brevis* from flocs containing MPNs. Results of the recovery of *K. brevis* cells after flocculation by kaolinite, kaolinite-chitosan, kaolinite-MPN and kaolinite-MPN-chitosan are summarized in FIG. 10. FIG. 10 specifically shows the recovery of *K. brevis* cells (initial cell density: $1.6\times10^5$ cells/mL) after flocculation and sedimentation using kaolinite (100 mg/L), kaolinite-chitosan (100 mg/L kaolinite+20 mg/L chitosan), kaolinite-MPN (100 mg/L kaolinite+100 mg/L MPN) and kaolinite-MPN-chitosan (100 mg/L kaolinite+100 mg/L MPN+20 mg/L chitosan).

After flocculation and sedimentation with the different flocculant mixtures, the residual cell concentration in the supernatant differed due to variations in their cell removal efficiencies. Based on an initial cell density of $1.6\times10^5$ cells/mL, *K. brevis* cell removal efficiencies ((initial cell concentration—sample cell concentration)/initial cell concentration ×100%) of 26%, 35%, 78% and 92% were achieved after flocculation by kaolinite, kaolinite-chitosan, kaolinite-MPN and kaolinite-MPN-chitosan respectively, in accordance with the observations of FIG. 7 that showed the efficacy of MPN formulations. As shown in FIG. 10, *K. brevis* cells flocculated using kaolinite and kaolinite-chitosan displayed an approximate exponential growth pattern similar to the control (*K. brevis* cell culture without flocculation), indicating a clear recovery of cell density after 10 days of incubation. In contrast, no apparent entry into an exponential growth phase during the 10 days is observed for the samples flocculated by kaolinite-MPN and kaolinite-MPN-chitosan, demonstrating the inhibition of *K. brevis* recovery. The inhibition of *K. brevis* recovery is attributed to effective entrapment of *K. brevis* cells within the MPN and MPN-chitosan shroud. Additionally, polyphenolics such as tannic acid used in the MPN film can have algaecidal properties, for example irreversibly damaging photosynthetic structures in algal cells, which could contribute to the inhibition of the growth and recovery of *K. brevis* cells after flocculation with kaolinite-MPN or kaolinite-MPN-chitosan.

Summary: This example illustrates that the combination of MPN films together with a small amount of chitosan leads to large flocs that are capable of sequestering over 30 *K. brevis* cells in a single floc as well as entrapping clay particles such as kaolinite to facilitate sinking of the entire floc. The flocculation occurs efficiently in saline environments with over 94% removal efficiency of *K. brevis* cells. The mesh-like shroud of MPN or MPN-chitosan inhibits the escape and regrowth of *K. brevis* cells after flocculation. The components used in the formulation are intrinsically benign. Thus, tannic acid is a naturally occurring plant based material that is inexpensive and generally recognized as safe, chitosan is biodegradable and nontoxic, and $Fe^{3+}$ is a nutrient in the marine environment.

Example 2—MPN/Kaolinite Compositions for Capture of *C. vulgaris*

Figure 11:
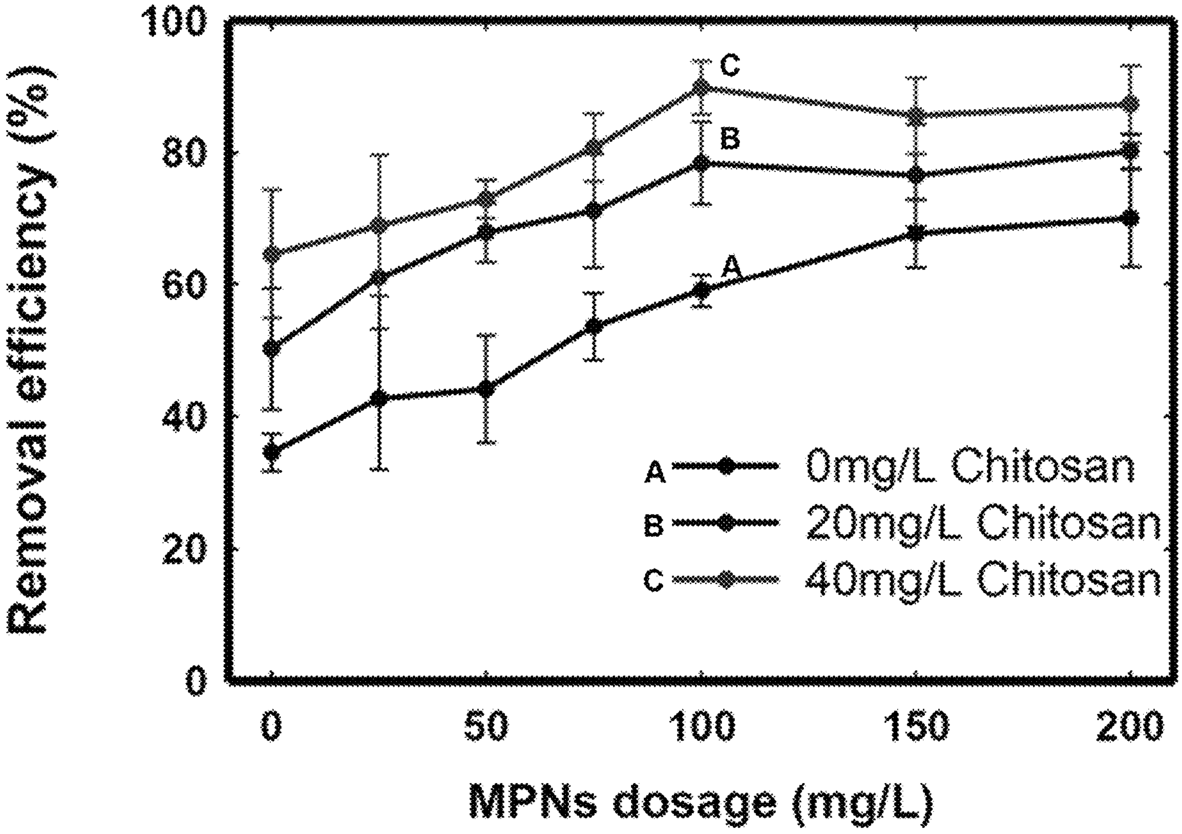
FIG. 11 is a graph showing removal efficiency of *C. vulgaris* from aqueous test samples using MPN compositions according to the disclosure as a function of MPN composition dosage and amount of networking biopolymer (chitosan).

The tests of Example 1 using MPN compositions including a tannic acid-iron MPN film, kaolinite clay particles, and a chitosan networking biopolymer were repeated, except that the *K. brevis* cells (i.e., a typical saltwater algal species) were replaced with Chiorella vulgaris cells, which is a model freshwater algal species. Test samples had an initial cell density of $1.04\times10^6$ cells/mL, 100 mg/L kaolinite, 0 to 200 mg/L MPN film, and 0 to 40 mg/L chitosan. FIG. 11 shows the effect of MPN, chitosan and MPN-chitosan dosages added to 100 mg/L kaolinite for the removal of the *C. vulgaris* cells. A removal efficiency of more than 90% was observed with dosage levels of 100 mg/L kaolinite, 100 mg/L MPN film, and 40 mg/L chitosan. Optical micrographs (not shown) of the flocs were qualitatively similar to those of FIG. 8 above for *K. brevis* cells, in particular showing the formation of flocs containing tens of *C. vulgaris* cells and having sizes up to about 100 to 500 μm, both with and without chitosan.

Example 3—MPN/PAC Compositions for Capture of *K. brevis*

Figure 12:
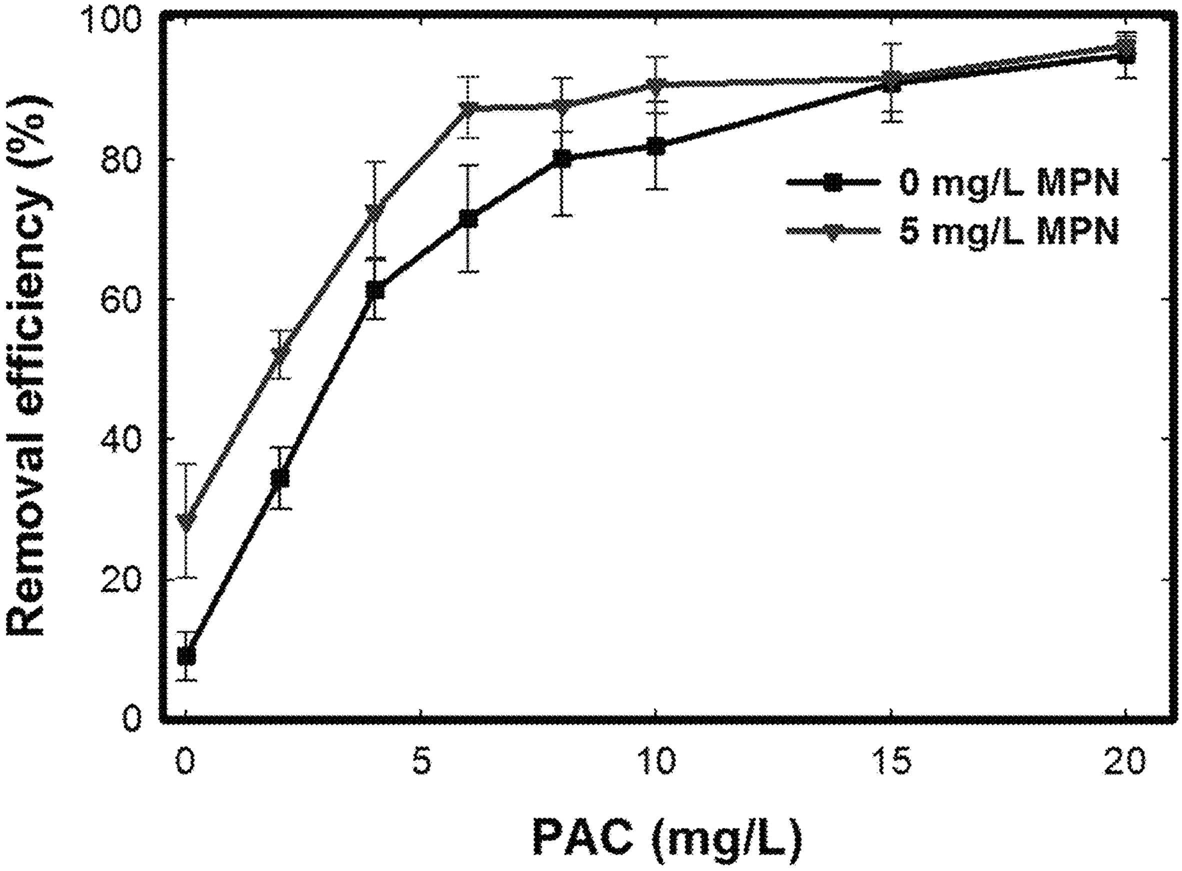
FIG. 12 is a graph showing removal efficiency of *K. brevis* from aqueous test samples using MPN compositions according to the disclosure in combination with polyaluminum chloride (PAC) as a secondary ionic flocculant.

The tests of Example 1 using MPN compositions including a tannic acid-iron MPN film and *K. brevis* cells were repeated, except that the kaolinite clay secondary flocculant was replaced with polyaluminum chloride (PAC), which is an ionic secondary flocculant. Test samples had 0 to 5 mg/L MPN film, and 0 to 20 mg/L PAC. FIG. 12 shows the effect of MPN and PAC dosages for the removal of the *K. brevis* cells. A removal efficiency of about 90% or more was observed with small dosage levels of 5 mg/L MPN film and 6 to 20 mg/L PAC. Optical micrographs (not shown) of the flocs were qualitatively similar to those of FIG. 8 above for *K. brevis* cells, in particular showing the formation of flocs containing tens of *K. brevis* cells and having sizes up to about 100 to 500 μm when a small amount of MPN was added to PAC, which represented a substantial increase in floc size and apparent mesh integrity relative to PAC alone as a flocculant. Shaking/agitation tests of the flocculated *K. brevis* cells also showed that the combination of MPN and PAC resulted in substantially improved floc cell retention, in particular as compared to PAC alone.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

LIST OF FIGURE ELEMENTS

100 metal phenolic network (MPN) composition
110 metal phenolic network (MPN) film
112 polyphenol
114 a multivalent metal ion
120 secondary flocculant (e.g., clay or ionic flocculant)
122 clay nanoplatelets
124 clay nanotubes
126 nanotube lumen
128 algaecide
130 networking biopolymer
132 MPN film-networking biopolymer complex
134 hydrogen bonds
200 aqueous or marine environment
210 top surface
220 bottom surface
230 harmful algal bloom
232 algae or algal cells
300 floc

What is claimed is:

1. A metal phenolic network (MPN) composition for treating algae in an aqueous environment, the composition comprising:

a metal phenolic network (MPN) film comprising a polyphenol and a multivalent metal ion coordinated to the polyphenol;

a flocculant comprising at least one of (i) clay nanoplatelets; (ii) clay nanotubes comprising an algaecide contained within an interior volume of the clay nanotubes; and (iii) an ionic flocculant comprising polyaluminum chloride; and water;

wherein the MPN composition is in the form of an aqueous suspension with the MPN film and the flocculant dispersed in the water.

2. The MPN composition of claim 1, wherein:

the polyphenol comprises tannic acid, and the multivalent metal ion comprises iron (III).

3. The MPN composition of claim 1, wherein the flocculant comprises the clay nanoplatelets.

4. The MPN composition of claim 1, wherein the flocculant comprises the clay nanotubes comprising the algaecide contained within the interior volume of the clay nanotubes.

5. The MPN composition of claim 1, wherein the flocculant comprises the ionic flocculant comprising polyaluminum chloride.

6. The MPN composition of claim 1, wherein a weight ratio of the MPN film relative to the flocculant is in a range of 0.1 to 10.

7. A metal phenolic network (MPN) composition for treating algae in an aqueous environment, the composition comprising:

a metal phenolic network (MPN) film comprising a polyphenol and a multivalent metal ion coordinated to the polyphenol;

a flocculant comprising at least one of clay particles and an ionic flocculant;

a networking biopolymer comprising at least one hydrogen-bonding functional group, wherein the networking biopolymer forms bridging links between different MPN films via hydrogen-bonding between (i) the hydrogen-bonding functional group of the networking biopolymer and (ii) at least one hydrogen-bonding functional group of the MPN film; and water;

wherein the MPN composition is in the form of an aqueous suspension with the MPN film and the flocculant dispersed in the water.

8. The MPN composition of claim 7, wherein the networking biopolymer comprises chitosan.

9. The MPN composition of claim 7, wherein a weight ratio of the MPN film relative to the networking biopolymer is in a range of 1 to 50.

10. A metal phenolic network (MPN) kit for treating algae in an aqueous environment, the kit comprising:

an aqueous suspension comprising: (i) water, and (ii) a metal phenolic network (MPN) film or component thereof dispersed in the water, the MPN film comprising a polyphenol and a multivalent metal ion coordinated to the polyphenol; and a flocculant in the form of a dried powder, the flocculant comprising at least one of clay particles and an ionic flocculant.

11. A method for treating algae in an aqueous environment, the method comprising:

providing a metal phenolic network (MPN) composition comprising: (i) a metal phenolic network (MPN) film comprising a polyphenol and a multivalent metal ion coordinated to the polyphenol, (ii) a flocculant comprising at least one of clay particles and an ionic flocculant, and (iii) water, wherein the MPN composition is in the form of an aqueous suspension with the MPN film and the flocculant dispersed in the water; and applying the MPN composition to an aqueous environment containing algae, thereby contacting the algae with the MPN composition and flocculating the algae (i) to form a floc comprising the MPN composition and a plurality of algal cells and (ii) to sediment the floc.

12. The method of claim 11, wherein at least 80 wt. % of the algae in the aqueous environment treated by the MPN composition are captured and sedimented in the floc.

13. The method of claim 11, wherein the algae are in the form of an algal bloom on a surface of the aqueous environment.

14. The method of claim 11, wherein the algae are selected from the group consisting of cyanobacteria, dinoflagellates, and diatoms.

15. The method of claim 11, wherein the aqueous environment is a freshwater marine environment.

16. The method of claim 11, wherein the aqueous environment is a saltwater marine environment.

17. The kit of claim 10, wherein:

the polyphenol comprises tannic acid, and the multivalent metal ion comprises Fe(III).

18. The kit of claim 10, wherein the flocculant comprises the clay particles, and the clay particles comprise clay nanoplatelets.

19. The kit of claim 10, wherein the flocculant comprises the clay particles, and the clay particles comprise clay nanotubes.

20. The kit of claim 19, further comprising an algaecide contained within an interior volume of the clay nanotubes.

21. The kit of claim 10, wherein the flocculant comprises the ionic flocculant, and the ionic flocculant comprises polyaluminum chloride.

22. The kit of claim 10, wherein the aqueous suspension comprises the MPN film, and a weight ratio of the MPN film relative to the flocculant is in a range of 0.1 to 10.

23. The kit of claim 10, wherein further comprising a networking biopolymer comprising at least one hydrogen-bonding functional group, wherein the networking biopolymer forms bridging links between different MPN films via hydrogen-bonding between (i) the hydrogen-bonding functional group of the networking biopolymer and (ii) at least one hydrogen-bonding functional group of the MPN film.

24. The kit of claim 23, wherein the networking biopolymer is chitosan.

25. The method of claim 11, wherein:

the polyphenol comprises tannic acid, and the multivalent metal ion comprises Fe(III).

* * * * *